(12) United States Patent
Carlson

(10) Patent No.: US 9,209,446 B2
(45) Date of Patent: Dec. 8, 2015

(54) LITHIUM BATTERIES UTILIZING NANOPOROUS SEPARATOR LAYERS

(75) Inventor: Steven Allen Carlson, Cambridge, MA (US)

(73) Assignee: Optodot Corporation, Woburn, MA (US)

(*) Notice: Subject to any disclaimer, the term of this patent is extended or adjusted under 35 U.S.C. 154(b) by 0 days.

(21) Appl. No.: 13/302,748

(22) Filed: Nov. 22, 2011

(65) Prior Publication Data

US 2012/0064399 A1 Mar. 15, 2012

Related U.S. Application Data

(63) Continuation-in-part of application No. PCT/US2010/001536, filed on May 26, 2010, and a continuation-in-part of application No. PCT/US2010/001537, filed on May 26, 2010,
(Continued)

(51) Int. Cl.
| | |
|---|---|
| *H01M 4/02* | (2006.01) |
| *H01M 2/16* | (2006.01) |
| *H01M 4/64* | (2006.01) |
| *H01M 10/42* | (2006.01) |

(Continued)

(52) U.S. Cl.
CPC ............ *H01M 2/166* (2013.01); *H01M 4/0421* (2013.01); *H01M 4/64* (2013.01); *H01M 10/4235* (2013.01); *H01M 4/136* (2013.01); *H01M 6/16* (2013.01); *H01M 10/052* (2013.01); *Y02T 10/7011* (2013.01); *Y10T 29/4911* (2015.01); *Y10T 29/49115* (2015.01)

(58) Field of Classification Search
CPC ....... H01M 10/04; H01M 4/02; H01M 2/166; H01M 4/64; H01M 10/4235; H01M 6/16; H01M 4/136; H01M 10/052; Y02E 60/12; Y02T 10/7011
USPC .......................................................... 429/209
See application file for complete search history.

(56) References Cited

U.S. PATENT DOCUMENTS

| | | | |
|---|---|---|---|
| 3,625,771 A | 12/1971 | Arrance et al. | |
| 3,647,554 A | 3/1972 | Arrance et al. | |

(Continued)

FOREIGN PATENT DOCUMENTS

| | | |
|---|---|---|
| CA | 2605874 | 1/2007 |
| EP | 0143562 A1 | 6/1985 |

(Continued)

*Primary Examiner* — Gary Harris
(74) *Attorney, Agent, or Firm* — Finch & Maloney PLLC

(57) ABSTRACT

Provided are lithium batteries comprising (a) a separator/electrode assembly of a current collector layer interposed between two electrode layers of one polarity bonded to a porous separator layer on each electrode surface, wherein each electrode layer is coated directly on a separator layer, (b) an electrode of the opposite polarity with a current collector layer interposed between two electrode layers of the opposite polarity, and (c) an electrolyte, where the batteries comprise alternating layers of the separator/electrode assembly and the electrode of the opposite polarity. Preferably, a portion of the assembly is not in contact with the electrode of the opposite polarity and a portion of the electrode of opposite polarity is not in contact with the assembly, and an electrically conductive device independently connects the portions of each polarity for effective current collection. Also provided are methods of preparing such lithium batteries.

24 Claims, 5 Drawing Sheets

NOT TO SCALE

Related U.S. Application Data application No. 13/302,748, which is a continuation-in-part of application No. PCT/US2010/001539, filed on May 26, 2010, application No. 13/302,748, which is a continuation-in-part of application No. PCT/US2010/001535, filed on May 26, 2010.

(60) Provisional application No. 61/217,132, filed on May 26, 2009.

(51) Int. Cl.
  *H01M 4/04* (2006.01)
  *H01M 6/16* (2006.01)
  *H01M 10/052* (2010.01)
  *H01M 4/136* (2010.01)

(56) References Cited

U.S. PATENT DOCUMENTS

| | | | |
|---|---|---|---|
| 5,162,175 A | 11/1992 | Visco et al. | |
| 5,194,341 A | 3/1993 | Bagley et al. | |
| 5,314,765 A | 5/1994 | Bates | |
| 5,326,391 A | 7/1994 | Anderson et al. | |
| 5,350,645 A | 9/1994 | Lake et al. | |
| 5,415,954 A | 5/1995 | Gauthier et al. | |
| 5,418,091 A | 5/1995 | Gozdz et al. | |
| 5,439,760 A | 8/1995 | Howard et al. | |
| 5,549,717 A | 8/1996 | Takeuchi et al. | |
| 5,569,520 A | 10/1996 | Bates | |
| 5,597,659 A | 1/1997 | Morigaki et al. | |
| 5,691,005 A | 11/1997 | Morigaki et al. | |
| 5,731,104 A | 3/1998 | Ventura et al. | |
| 5,778,515 A | 7/1998 | Menon | |
| 5,824,434 A | 10/1998 | Kawakami et al. | |
| 5,840,087 A | 11/1998 | Gozdz et al. | |
| 5,882,721 A | 3/1999 | Delnick | |
| 5,894,656 A | 4/1999 | Menon et al. | |
| 5,948,464 A | 9/1999 | Delnick | |
| 6,148,503 A | 11/2000 | Delnick et al. | |
| 6,153,337 A | 11/2000 | Carlson et al. | |
| 6,162,563 A | 12/2000 | Miura et al. | |
| 6,183,901 B1 | 2/2001 | Ying et al. | |
| 6,194,098 B1 | 2/2001 | Ying et al. | |
| 6,268,087 B1 | 7/2001 | Kim et al. | |
| 6,277,514 B1 | 8/2001 | Ying et al. | |
| 6,287,720 B1 | 9/2001 | Yamashita et al. | |
| 6,306,545 B1 | 10/2001 | Carlson et al. | |
| 6,328,770 B1 | 12/2001 | Gozdz | |
| 6,344,293 B1 | 2/2002 | Geronov | |
| 6,410,182 B1 | 6/2002 | Ying et al. | |
| 6,423,444 B1 | 7/2002 | Ying et al. | |
| 6,451,484 B1 | 9/2002 | Han et al. | |
| 6,488,721 B1* | 12/2002 | Carlson | 29/623.5 |
| 6,497,780 B1 | 12/2002 | Carlson | |
| 6,723,467 B2 | 4/2004 | Yoshida et al. | |
| 6,811,928 B2 | 11/2004 | Aihara et al. | |
| 7,014,948 B2 | 3/2006 | Lee et al. | |
| 7,066,971 B1 | 6/2006 | Carlson | |
| 7,070,632 B1 | 7/2006 | Visco et al. | |
| 7,081,142 B1 | 7/2006 | Carlson | |
| 7,115,339 B2 | 10/2006 | Nakajima et al. | |
| 7,160,603 B2 | 1/2007 | Carlson | |
| 7,378,185 B2 | 5/2008 | Fujikawa et al. | |
| 7,396,612 B2 | 7/2008 | Ohata et al. | |
| 7,402,184 B2 | 7/2008 | Ikuta et al. | |
| 7,419,743 B2 | 9/2008 | Fujikawa et al. | |
| 7,422,825 B2 | 9/2008 | Inoue et al. | |
| 7,470,488 B2 | 12/2008 | Lee et al. | |
| 7,560,193 B2 | 7/2009 | Ikuta et al. | |
| 7,575,606 B2 | 8/2009 | Fukumoto et al. | |
| 7,595,130 B2 | 9/2009 | Kawabata et al. | |
| 7,638,230 B2 | 12/2009 | Fujita et al. | |
| 7,638,241 B2 | 12/2009 | Lee et al. | |
| 7,662,517 B2 | 2/2010 | Lee et al. | |
| 7,674,559 B2 | 3/2010 | Min et al. | |
| 7,682,740 B2 | 3/2010 | Yong et al. | |
| 7,682,751 B2 | 3/2010 | Kato et al. | |
| 7,687,202 B2 | 3/2010 | Nishino et al. | |
| 7,695,870 B2 | 4/2010 | Park et al. | |
| 7,704,641 B2 | 4/2010 | Yong et al. | |
| 7,709,152 B2 | 5/2010 | Kim et al. | |
| 7,709,153 B2 | 5/2010 | Lee et al. | |
| 7,745,042 B2 | 6/2010 | Fujino et al. | |
| 7,754,375 B2 | 7/2010 | Fujikawa et al. | |
| 7,754,377 B2 | 7/2010 | Ohata et al. | |
| 7,758,998 B2 | 7/2010 | Ohata et al. | |
| 7,759,004 B2 | 7/2010 | Ikuta et al. | |
| 7,811,700 B2 | 10/2010 | Hennige et al. | |
| 7,816,038 B2 | 10/2010 | Ohata et al. | |
| 7,829,242 B2 | 11/2010 | Hörpel et al. | |
| 8,076,027 B2 | 12/2011 | Honda et al. | |
| 2001/0000485 A1 | 4/2001 | Ying et al. | |
| 2001/0038938 A1 | 11/2001 | Takahashi et al. | |
| 2001/0053475 A1 | 12/2001 | Ying et al. | |
| 2002/0092155 A1 | 7/2002 | Carlson et al. | |
| 2002/0141029 A1 | 10/2002 | Carlson et al. | |
| 2003/0035995 A1 | 2/2003 | Ohsaki et al. | |
| 2003/0118910 A1 | 6/2003 | Carlson | |
| 2003/0171784 A1 | 9/2003 | Dodd et al. | |
| 2004/0038090 A1* | 2/2004 | Faris | 429/12 |
| 2004/0043295 A1 | 3/2004 | Rodriguez et al. | |
| 2004/0185335 A1 | 9/2004 | Carlson | |
| 2004/0188880 A1 | 9/2004 | Bauer et al. | |
| 2004/0241540 A1 | 12/2004 | Tsutsumi et al. | |
| 2005/0221190 A1 | 10/2005 | Sudano et al. | |
| 2005/0266305 A1 | 12/2005 | Ohata et al. | |
| 2006/0008698 A1 | 1/2006 | Kim et al. | |
| 2006/0127753 A1 | 6/2006 | Nakashima et al. | |
| 2006/0172158 A1 | 8/2006 | Min et al. | |
| 2006/0172185 A1 | 8/2006 | Mimura | |
| 2006/0177732 A1 | 8/2006 | Visco et al. | |
| 2006/0222954 A1 | 10/2006 | Skotheim et al. | |
| 2006/0275661 A1 | 12/2006 | Kim et al. | |
| 2007/0065714 A1 | 3/2007 | Hambitzer et al. | |
| 2007/0108120 A1 | 5/2007 | Carlson | |
| 2007/0110990 A1 | 5/2007 | Carlson | |
| 2007/0111070 A1 | 5/2007 | Carlson | |
| 2007/0178384 A1 | 8/2007 | Kajita et al. | |
| 2007/0184350 A1* | 8/2007 | Kim et al. | 429/247 |
| 2007/0189959 A1 | 8/2007 | Carlson et al. | |
| 2007/0190427 A1 | 8/2007 | Carlson et al. | |
| 2007/0204458 A1 | 9/2007 | Fujita et al. | |
| 2007/0243460 A1 | 10/2007 | Carlson et al. | |
| 2007/0269714 A1 | 11/2007 | Watanabe et al. | |
| 2008/0032197 A1* | 2/2008 | Horpel et al. | 429/224 |
| 2008/0166202 A1 | 7/2008 | Dunlap et al. | |
| 2008/0182174 A1 | 7/2008 | Carlson et al. | |
| 2009/0017380 A1 | 1/2009 | Honda et al. | |
| 2009/0087728 A1 | 4/2009 | Less et al. | |
| 2009/0155678 A1* | 6/2009 | Less et al. | 429/144 |
| 2009/0246636 A1 | 10/2009 | Chiang et al. | |
| 2010/0261065 A1 | 10/2010 | Babinec et al. | |
| 2011/0097623 A1 | 4/2011 | Marinis, Jr. et al. | |
| 2011/0281171 A1 | 11/2011 | Yong et al. | |

FOREIGN PATENT DOCUMENTS

| | | |
|---|---|---|
| EP | 0523840 B1 | 1/1993 |
| EP | 0600718 B1 | 6/1994 |
| EP | 0814520 A2 | 12/1997 |
| EP | 0836238 B1 | 4/1998 |
| EP | 0848435 B1 | 6/1998 |
| EP | 0875950 A2 | 11/1998 |
| EP | 0892449 A1 | 1/1999 |
| EP | 1156544 | 11/2011 |
| JP | H0614077 | 5/1994 |
| JP | H0927343 | 1/1997 |
| JP | H10214639 | 8/1998 |
| JP | 2011233144 A | 8/1999 |
| JP | 2002042882 | 2/2002 |
| JP | 2003223926 | 8/2003 |
| JP | 2005022674 A1 | 3/2005 |
| JP | 2005235695 | 9/2005 |
| JP | 2007258160 | 10/2007 |

(56) References Cited

FOREIGN PATENT DOCUMENTS

| | | |
|---|---|---|
| JP | 2008041404 | 2/2008 |
| JP | 2008123988 | 5/2008 |
| WO | 9102385 A1 | 2/1991 |
| WO | 9103080 A1 | 3/1991 |
| WO | 9931751 | 6/1999 |
| WO | 9933125 A1 | 7/1999 |
| WO | 99057770 A1 | 11/1999 |
| WO | 0076011 A | 12/2000 |
| WO | 0139293 | 5/2001 |
| WO | 2009/014388 | 1/2009 |
| WO | 2009026467 A1 | 2/2009 |
| WO | 2010138176 | 12/2010 |
| WO | 2010138177 | 12/2010 |
| WO | 2010138179 | 12/2010 |
| WO | 2013146126 | 10/2013 |

* cited by examiner

NOT TO SCALE

NOT TO SCALE

NOT TO SCALE

NOT TO SCALE

NOT TO SCALE

NOT TO SCALE

NOT TO SCALE

NOT TO SCALE

NOT TO SCALE

LITHIUM BATTERIES UTILIZING NANOPOROUS SEPARATOR LAYERS

RELATED APPLICATIONS

The present application is a continuation-in-part of and claims the benefit of and priority to PCT Application No. PCT/US2010/001536, filed May 26, 2010, which claims the benefit under 35 U.S.C. §119(e) of U.S. Provisional Patent Application No. 61/217,132, filed May 26, 2009. The present application is also a continuation-in-part of and claims the benefit of and priority to PCT Application No. PCT/US2010/001537, filed May 26, 2010, which claims the benefit under 35 U.S.C. §119(e) of U.S. Provisional Patent Application No. 61/217,132, filed May 26, 2009. The present application is also a continuation-in-part of and claims the benefit of and priority to PCT Application No. PCT/US2010/001539, filed May 26, 2010, which claims the benefit under 35 U.S.C. §119(e) of U.S. Provisional Patent Application No. 61/217,132, filed May 26, 2009. The present application is also a continuation-in-part of and claims the benefit of and priority to PCT Application No. PCT/US2010/001535, filed May 26, 2010, which claims the benefit under 35 U.S.C. §119(e) of U.S. Provisional Patent Application No. 61/217,132, filed May 26, 2009. The entireties of each of the above-referenced patent applications are incorporated herein by reference.

FIELD OF THE INVENTION

The present invention relates generally to the field of batteries and other electric current producing cells. More particularly, this invention pertains to lithium batteries that utilize nanoporous separators and to methods of preparing lithium batteries by taking advantage of the nanoporous structure of the separator to overlay the other layers of the battery in a desired configuration.

BACKGROUND OF THE INVENTION

Lithium batteries, including rechargeable or secondary lithium ion batteries, non-rechargeable or primary lithium batteries, and other types such as lithium-sulfur batteries, are typically made by interleaving a plastic separator, a metal substrate with a cathode layer coated on both sides, another plastic separator, and another metal substrate with an anode layer coated on both sides. To maintain the alignment of the strips of these materials and for other quality reasons, this interleaving is usually done on automatic equipment, which is complex and expensive. Also, in order to achieve sufficient mechanical strength and integrity, the separators and the metal substrates are relatively thick, such as 10 microns in thickness or more. For example, a typical thickness of the copper metal substrate for the anode coating layers is 10 microns, a typical thickness of the aluminum metal substrate for the cathode coating layers is 12 microns, and the plastic separators typically have thicknesses ranging from 12 to 20 microns. These thick separators and metal substrates are not electrochemically active and thus lower the volume of the electroactive material in the electrodes of the lithium batteries. This limits the energy density and power density of the lithium batteries.

Among the new applications for lithium batteries are high power batteries for hybrid, plug-in hybrid, and electric vehicles. In contrast to the cylindrical metal cells used in lithium batteries for portable computers and other applications, many of the lithium batteries for vehicles are of a flat or prismatic design. Also, the lithium batteries for vehicles need to be economical. Potential approaches to make higher energy and more economical lithium batteries for vehicles and other applications include greatly increasing the proportion or percentage of the volume of the electroactive material in each battery and reducing the complexity and expense of the automated equipment to fabricate the battery.

It would be advantageous if a lithium battery comprised separator and metal substrate layers that were much thinner than are currently used and thereby had a greater content of electroactive material. It would be particularly advantageous if this lithium battery could be fabricated on less complex and less expensive automated processing equipment than, for example, the winding equipment utilized for portable computer batteries, and furthermore was particularly adapted for making flat or prismatic batteries.

SUMMARY OF THE INVENTION

This invention pertains to batteries and other electric current producing cells, especially lithium batteries, that utilize nanoporous separators, particularly heat resistant separators with dimensional stability at temperatures at and above 200° C., and to methods of preparing lithium batteries by taking advantage of the nanoporous structure of the separator to coat the other layers of the battery in a desired thickness and configuration on the separator.

One aspect of the present invention pertains to a lithium battery comprising (a) a separator/electrode assembly, wherein the assembly comprises a current collector layer interposed between a first electrode layer and a second electrode layer of the same polarity and a porous separator layer on the side of each of the two electrode layers on the side opposite to the current collector layer, and wherein each of the electrode layers is coated directly on one of the separator layers, (b) an electrode, wherein the electrode comprises a current collector layer interposed between two electrode layers of the opposite polarity to the first and second electrode layers of the same polarity, and (c) an electrolyte, wherein the battery comprises alternating layers of the separator/electrode assembly and the electrode. In one embodiment, a portion of the assembly is not in contact with the electrode.

In one embodiment of the lithium batteries of this invention, the portion of the assembly that is not in contact with the electrode is in contact with an additional one or more portions of the assembly that are not in contact with the electrode. In one embodiment, a device having electrically conductive pins is in electrical contact with the portion of the assembly and the additional one or more portions of the assembly and is not in electrical contact with any portion of the electrode.

In one embodiment of the lithium batteries of the present invention, a portion of the electrode is not in contact with the assembly. In one embodiment, the portion of the electrode is in contact with an additional one or more portions of the electrode that are not in contact with the assembly. In one embodiment, a device having electrically conductive pins is in electrical contact with the portion of the electrode and the additional one or more portions of the electrode and is not in electrical contact with any portion of the assembly. In one embodiment of the lithium batteries of this invention, a portion of the assembly is not in contact with the electrode and is in contact with an additional one or more portions of the assembly that are not in contact with the electrode. In one embodiment, a device having electrically conductive pins is in electrical contact with the portion of the assembly and the additional one or more portions of the assembly and is not in electrical contact with any portion of the electrode.

In one embodiment of the lithium batteries of this invention, the first and second electrode layers of the assembly are cathode layers. In one embodiment, the current collector layer of the assembly comprises an aluminum layer. In one embodiment, the thickness of the aluminum layer is less than 3 microns.

In one embodiment of the lithium batteries of the present invention, the first and second electrode layers of the assembly are anode layers. In one embodiment, the current collector layer of the assembly comprises a metal layer selected from the group consisting of a copper layer and a nickel layer. In one embodiment, the thickness of the metal layer is less than 3 microns.

In one embodiment of the lithium batteries of this invention, the porous separator layer comprises pores having an average pore diameter of less than 0.2 microns, and preferably less than 0.1 microns. In one embodiment, the separator layer has a thickness of less than 9 microns, and preferably less than 6 microns. In one embodiment, the separator layer comprises a porous layer comprising aluminum boehmite.

Another aspect of the present invention pertains to methods of making a lithium battery comprising the steps of (a) coating a porous separator layer on a substrate; (b) coating an electrode layer of one polarity directly on the separator layer; (c) coating one or more current collector layers directly on the electrode layer to make a separator/electrode stack; (d) laminating two of the separator/electrode stacks together and delaminating the substrate from the separator layer to form a separator/electrode assembly having the one or more current collector layers interposed between the two electrode layers of the assembly; and (e) interleaving the assembly with an electrode comprising a current collector layer interposed between two electrode layers of opposite polarity to the electrode layer of step (b) to form a dry separator/electrode cell. In one embodiment, the assembly and the electrode are in a sheet configuration prior to the interleaving step. In one embodiment, after step (e), a portion of the assembly is not in contact with the electrode and a portion of the electrode is not in contact with the assembly, and wherein a first device with electrically conductive pins electrically connects two or more of the portions of the assembly and a second device with electrically conductive pins electrically connects two or more of the portions of the electrode. In one embodiment, there are further steps of (1) enclosing the dry separator/electrode cell in a casing and (2) filling with electrolyte and sealing.

In one embodiment of the methods of making lithium batteries of this invention, at least one of the one or more current collector layers of step (c) comprises a metal layer and the thickness of the metal layer is less than 3 microns. In one embodiment, the porous separator layer comprises pores having an average pore diameter of less than 0.2 microns, and preferably less than 0.1 microns. In one embodiment, the separator layer has a thickness of less than 9 microns, and preferably less than 6 microns.

BRIEF DESCRIPTION OF THE DRAWINGS

For the purpose of illustrating the invention, particular arrangements and methodologies are shown in the drawings. It should be understood, however, that the invention is not limited to the precise arrangements shown or to the methodologies of the detailed description.

DETAILED DESCRIPTION OF THE INVENTION

Figure 1:
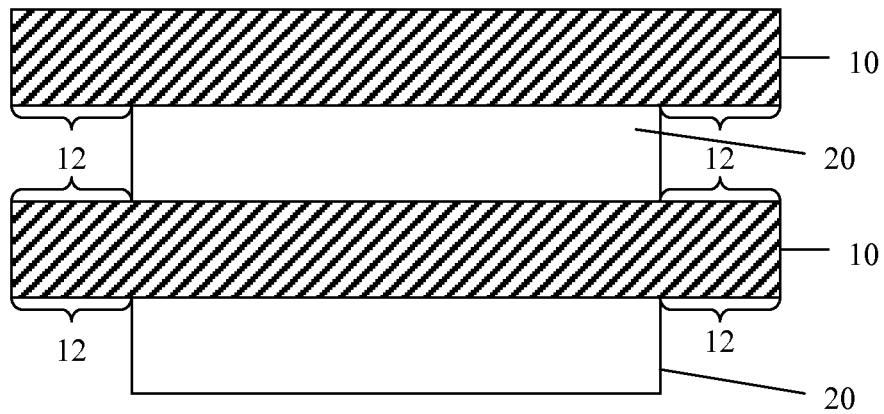
FIG. 1 shows a cross-section view of the alternating layers of a separator/electrode assembly and an electrode where a portion of the assembly is not in contact with the electrode.

The lithium batteries and methods of preparing lithium batteries of the present invention provide a flexible and effective approach to lithium batteries with higher energy and power densities and with lower manufacturing and capital equipment costs.

One aspect of the present invention pertains to a lithium battery comprising (a) a separator/electrode assembly, wherein the assembly comprises a current collector layer interposed between a first electrode layer and a second electrode layer of the same polarity and a porous separator layer on the side of each of the first and second electrode layers opposite to the current collector layer, and wherein each of the electrode layers is coated directly on one of the separator layers, (b) an electrode, wherein the electrode comprises a current collector layer interposed between two electrode layers of the opposite polarity to the first and second electrode layers of the same polarity, and (c) an electrolyte, wherein the battery comprises alternating layers of the assembly and the electrode. In one embodiment, a portion of the assembly is not in contact with the electrode.

As used herein, the word "battery" pertains to both a single electric current producing cell and to multiple electric current producing cells combined in a casing or pack. As used herein, the term "lithium battery" refers to all types of lithium batteries known in the art, including, but not limited to, rechargeable or secondary lithium ion batteries, non-rechargeable or primary lithium batteries, and other types such as lithium-sulfur batteries.

As used herein, the term "current collector layer" refers to one or more current collection layers that are adjacent to an electrode layer. This includes, but is not limited to, a single conductive metal layer or substrate and a single conductive metal layer or substrate with an overlying conductive coating, such as a carbon black-based polymer coating. Examples of a conductive metal substrate as the current collector are a metal substrate comprising aluminum, which is typically used as the current collector and substrate for the positive electrode or cathode layer, and a metal substrate comprising copper, which is typically used as the current collector and substrate for the negative electrode or anode layer. The current collector layers of both the separator/cathode assembly and the separator/anode assembly types of a separator/electrode assembly may comprise an electrically conductive material selected from the group consisting of electrically conductive metals including metal pigments or particles, electrically conductive carbons including carbon black and graphite pigments, and electrically conductive polymers. These electrically conductive materials may be combined with an organic polymer for added mechanical strength and flexibility to form the current collector layer.

As used herein, the term "electrode layer" refers to a layer of the cell that comprises electroactive material. When the electrode layer is where the lithium is present in the case of primary lithium batteries or, in the case of rechargeable lithium batteries, is formed during the charging of the battery and is oxidized to lithium ions during the discharging of the battery, the electrode layer is called the anode or negative electrode. The other electrode of opposite polarity is called the cathode or positive electrode. Any of the electroactive materials that are useful in lithium batteries may be utilized in the electrode layers of this invention. Examples include, but are not limited to, lithium cobalt oxide, lithium manganese oxide, lithium iron phosphate, and sulfur as electroactive materials in the cathode layers and lithium titanate, lithium-intercalated carbon, lithium-intercalated graphite, and lithium metal as electroactive materials in the anode layers.

As used herein, the word "electrolyte" refers to any of the electrolytes that are useful in lithium batteries. Suitable electrolytes include, but are not limited to, liquid electrolytes, gel polymer electrolytes, and solid polymer electrolytes. Suitable liquid electrolytes include, but are not limited to, $LiPF_6$ solutions in a mixture of organic solvents, such as, for example, a mixture of ethylene carbonate, propylene carbonate, and ethyl methyl carbonate.

Figure 2:
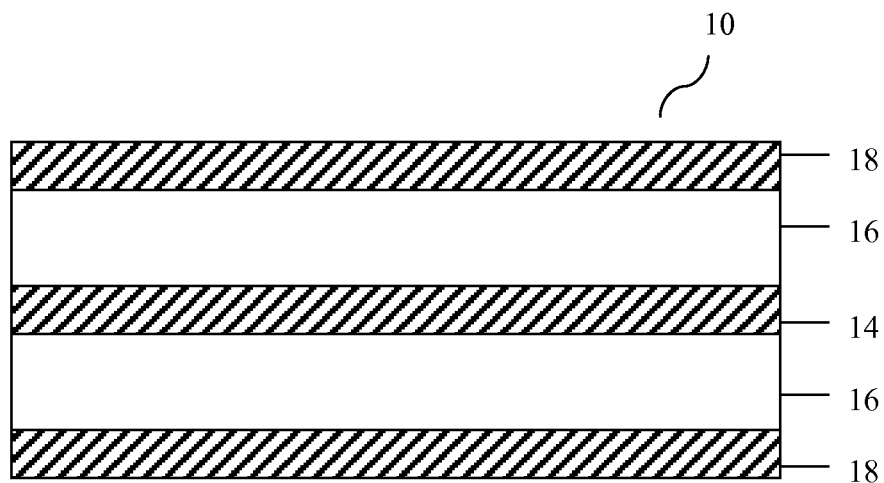
FIG. 2 shows a cross-section view of a separator/electrode assembly with a current collector layer interposed between electrode layers and separator layers.
Figure 3:
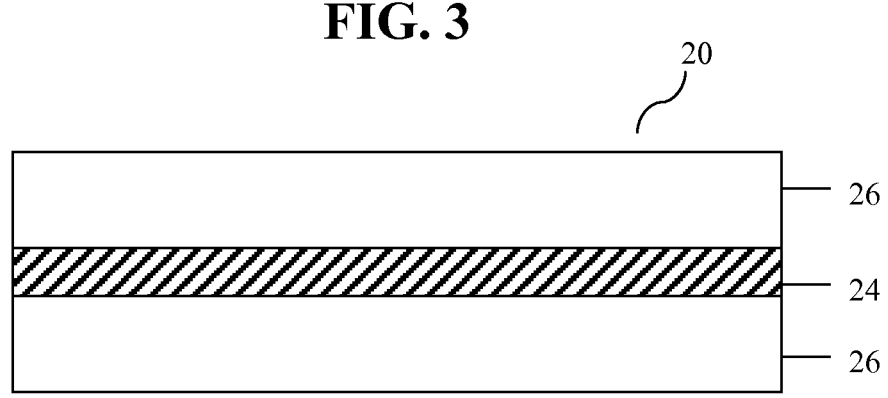
FIG. 3 shows a cross-section view of an electrode with a current collector layer interposed between electrode layers.

FIG. 1 shows an example of a cross-section view (not to scale) of the alternating layers of a separator/electrode assembly 10 and an electrode 20 where a portion 12 of the assembly 10 is not in contact with the electrode 20. One purpose for having a portion of the separator/electrode assembly that is not in contact with the electrode, such as, for example, the portion of the assembly having no overlying or underlying layers of the electrode is to provide for an area of the separator/electrode assembly where the individual current collector layers may be directly electrically connected to each other for more efficient operation of the lithium battery. FIG. 2 shows an example of a cross-section view (not to scale) of a separator/electrode assembly 10 of this invention with a current collector layer 14 interposed between electrode layers 16 and separator layers 18. FIG. 3 shows an example of a cross-section view (not to scale) of an electrode 20 of the present invention with a current collector layer 24 interposed between electrode layers 26.

In one embodiment of the lithium batteries of this invention, the portion of the assembly that is not in contact with the electrode is in contact with an additional one or more portions of the assembly that are not in contact with the electrode. In one embodiment, a device having electrically conductive pins is in electrical contact with the portion of the assembly and the additional one or more portions of the assembly and is not in electrical contact with the electrode.

Figure 4:
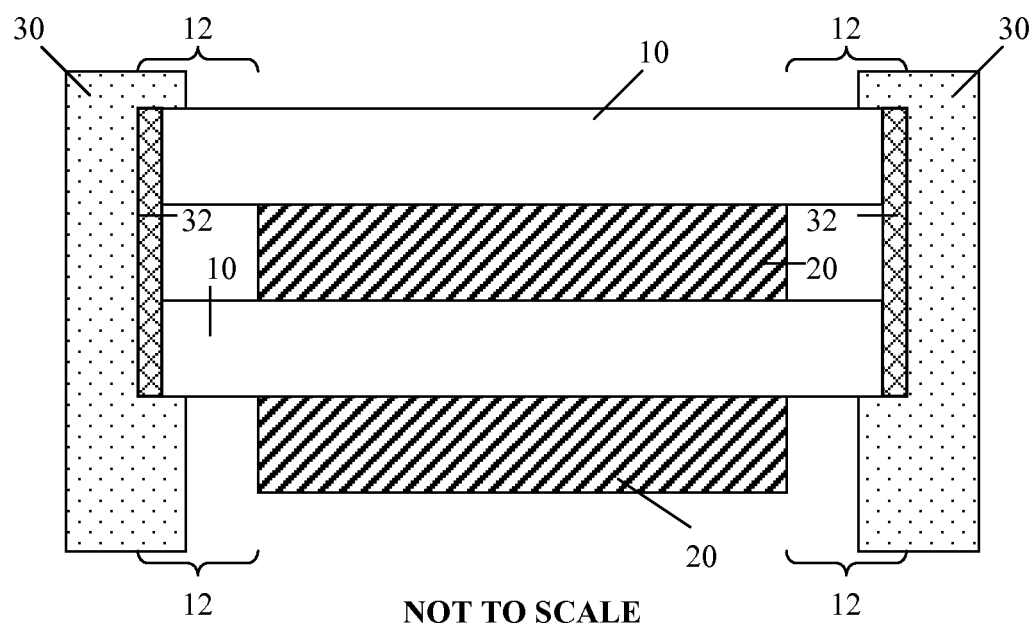
FIG. 4 shows a cross-section view of a device with electrically conductive pins that makes electrical connections between a portion of the assembly without making electrical connection with the electrode.

FIG. 4 shows an example of a cross-section view (not to scale) of a device 30 with electrically conductive pins 32 that makes electrical connections between two or more portions 12 of the assembly 10 without making electrical connection with the electrode 20.

Figure 5:
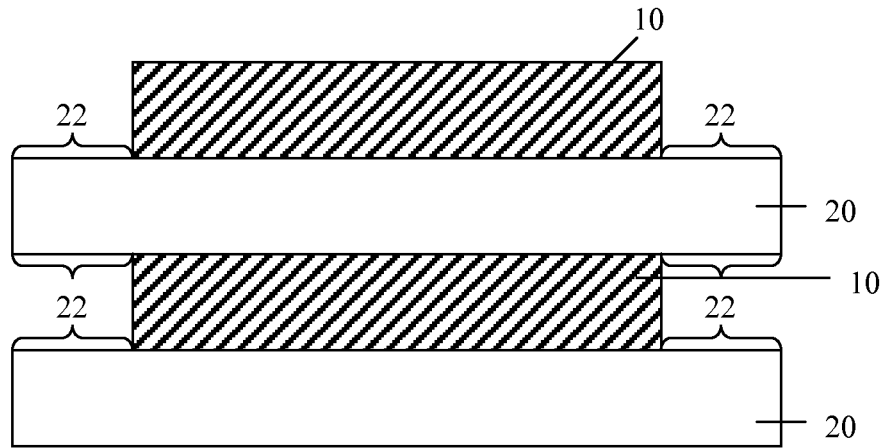
FIG. 5 shows a cross-section view of the alternating layers of a separator/electrode assembly and an electrode where a portion of the electrode is not in contact with the assembly.

In one embodiment of the lithium batteries of the present invention, a portion of the electrode is not in contact with the assembly. FIG. 5 shows an example of a cross-section view (not to scale) of the alternating layers of a separator/electrode assembly 10 and an electrode 20 where a portion 22 of the electrode 20 is not in contact with the assembly 10. Similarly to that described above for the separator/electrode assembly, one purpose for having a portion of the electrode that is not in contact with the separator/electrode assembly, such as, for example, the portion of the electrode having no overlying or underlying layers of the assembly is to provide for an area of the electrode where the individual current collector layers may be directly electrically connected to each other for more efficient operation of the lithium battery. In one embodiment, the portion of the electrode that is not in contact with the assembly is in contact with an additional one or more portions of the electrode that are not in contact with the assembly. In one embodiment, a device having electrically conductive pins is in electrical contact with the portion of the electrode and the additional one or more portions of the electrode and is not in electrical contact with the assembly. By the word "pins," as used herein, is meant any shape, such as, for example, rods, clamps with or without sharp protrusions that can penetrate multiple layers, and screws with or without positioning holes in the casing or another part of the outer packaging to position the screws and hold them in place, that is effective in electrically contacting all of the protruding layers or portions of either the separator/electrode assembly or the electrode.

Figure 6:
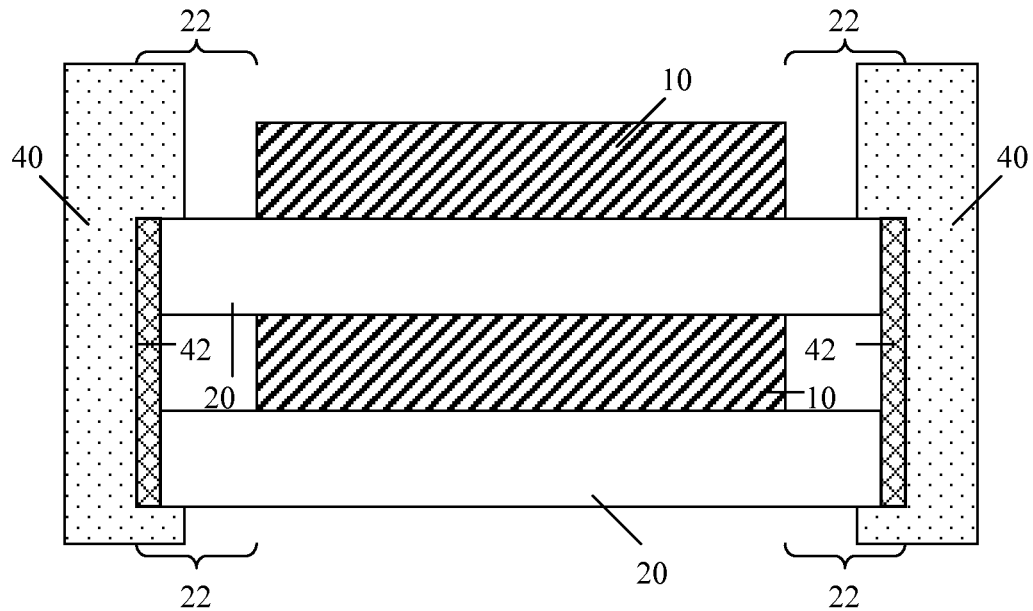
FIG. 6 shows a cross-section view of a device with electrically conductive pins that makes electrical connections between a portion of the electrode without making electrical connection with the assembly.
Figure 7:
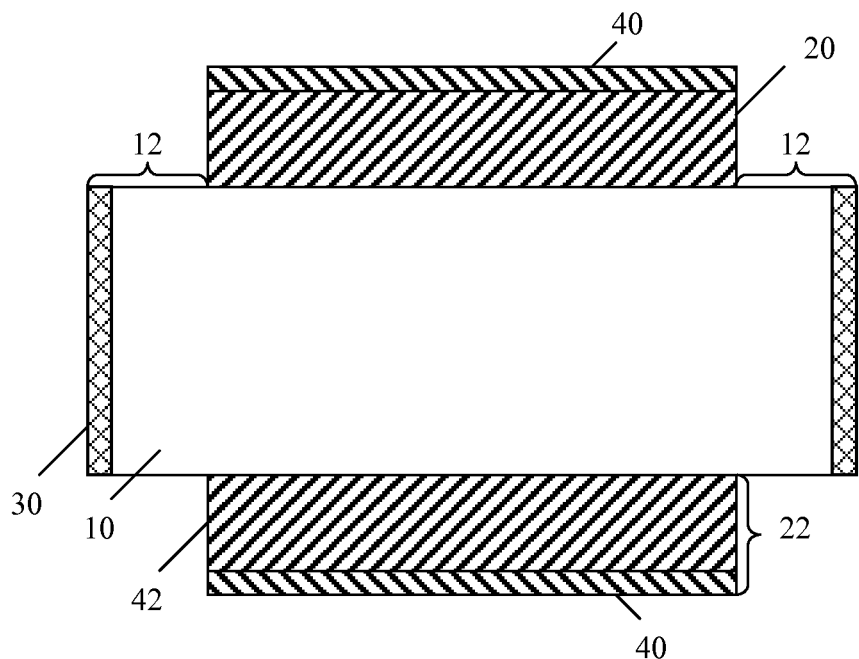
FIG. 7 shows a top-down view of the alternating layers where the device, as shown in FIG. 4, is in electrical contact with the portion of the assembly, as shown in FIG. 1, and with an additional one or more underlying portions of the assembly, and where the device, as shown in FIG. 6, is in electrical contact with the portion of the electrode, as shown in FIG. 5, and with an additional one or more underlying portions of the electrode.

FIG. 6 shows an example of a cross-section view (not to scale) of a device 40 with electrically conductive pins 42 that makes electrical connections between a portion 22 of the electrode 20 without making electrical connection with the assembly 10. In one embodiment, a portion of the assembly is not in contact with the electrode and is in contact with an additional one or more portions of the assembly that are not in contact with the electrode. In one embodiment, a device having electrically conductive pins is in electrical contact with the portion of the assembly and the additional one or more portions of the assembly and is not in electrical contact with any portion of the electrode. FIG. 7 shows an example of a top-down view (not to scale) of the alternating layers where device 30, as shown in FIG. 4, is in electrical contact with the portion 12 of the assembly 10, as shown in FIG. 1, and with an additional one or more underlying portions 12 of the assembly 10, and where device 40, as shown in FIG. 6, is in electrical contact with the portion 22 of the electrode 20, as shown in FIG. 5, and with an additional one or more underlying portions 22 of the electrode 20.

In one embodiment of the lithium batteries of this invention, the two electrode layers of the separator/electrode assembly are cathode layers. In one embodiment, the current collector layer of the assembly comprises an aluminum layer. In one embodiment, the thickness of the aluminum layer is less than 3 microns.

In one embodiment of the lithium batteries of the present invention, the two electrode layers of the separator/electrode assembly are anode layers. In one embodiment, the current collector layer of the assembly comprises a metal layer selected from the group consisting of a copper layer and a nickel layer. In one embodiment, the thickness of the metal layer is less than 3 microns.

In one embodiment of the lithium batteries of this invention, the porous separator layer comprises pores having an average pore diameter of less than 0.2 microns, and preferably less than 0.1 microns. In one embodiment, the separator layer has a thickness of less than 9 microns, and preferably less than 6 microns. In one embodiment, the separator layer comprises a porous layer comprising a xerogel layer or xerogel membrane, including, but not limited to, a porous layer comprising aluminum boehmite.

By the term "xerogel layer", as used herein, is meant a porous layer that was formed by a xerogel or sol gel process of drying a colloidal sol liquid to form a solid gel material. By the term "xerogel membrane", as used herein, is meant a membrane that comprises at least one layer comprising a xerogel layer where the pores of the xerogel layer are continuous from one side of the layer to the other side of the layer. Xerogel layers and membranes typically comprise inorganic oxide materials, such as aluminum oxides, aluminum boehmites, and zirconium oxides, as the sol gel materials. Examples of suitable xerogel membranes for the present invention include, but are not limited to, the xerogel membranes described in U.S. Pat. Nos. 6,153,337 and 6,306,545 to Carlson et al. and U.S. Pat. Nos. 6,488,721 and 6,497,780 to Carlson.

Many inorganic oxide materials, such as, for example, aluminum oxides and aluminum boehmites, are non-flammable and do not melt at temperatures below 1000° C. Porous separator layers that comprise these inorganic oxide materials in a xerogel membrane or as a blend of inorganic oxide particles and organic polymer where the weight percent of the inorganic oxide in the porous separator layer is greater than about 30% provide a heat resistant separator layer that retains its dimensional stability at temperatures at and above 200° C.

Another aspect of the present invention pertains to methods of making a lithium battery comprising the steps of (a) coating a porous separator layer on a substrate; (b) coating an electrode layer of a polarity directly on the separator layer; (c) coating one or more current collector layers directly on the electrode layer to make a separator/electrode stack; (d) laminating two of the separator/electrode stacks together and delaminating the substrate from the separator layer to form a separator/electrode assembly having the one or more current collector layers interposed between the two electrode layers of the assembly; and (e) interleaving the assembly with an electrode comprising a current collector layer interposed between two electrode layers of opposite polarity to the electrode layer of step (b) to form a dry separator/electrode cell. In one embodiment, the assembly and the electrode are in a sheet configuration prior to the interleaving step.

Examples of suitable separator coatings for the present invention include, but are not limited to, the separator coatings described in U.S. Pat. Nos. 6,153,337 and 6,306,545 to Carlson et al. and U.S. Pat. Nos. 6,488,721 and 6,497,780 to Carlson. These separator coatings may be coated from an aqueous mix or a solvent mix onto a variety of substrates, such as, for example, silicone-treated plastic and paper substrates, polyester film substrates, polyolefin-coated papers, metal substrates, porous polyolefin films, and porous nonwoven polymer fiber substrates. The advantages of coating the separator onto a substrate for this invention include, but are not limited to, (a) that the other layers of the lithium battery may be coated or laminated overlying this separator coating layer and then subsequently the substrate may be removed by delaminating to provide a dry stack of battery layers, (b) the coating process for the separator lends itself to making thinner separators than are typically available from an extrusion process for the separator, and (c) the coated separator layer may be nanoporous with pore diameters of less than 0.1 microns that are too small to allow any penetration of the particles of the electrode and other overlying coating layers into the separator layer. Even separator layers with pore diameters up to 0.2 microns have been found to prevent the penetration into the separator layer of any particles of carbon black pigments as are typically used in lithium batteries.

As used herein, nanoporous layers are defined as layers where the average pore diameter is less than 100 nm, or, equivalently, less than 0.1 microns. Since the particles in the electrode layer and in the current collector layer, if the current collector layer comprises any particles, are larger than 0.1 microns in diameter and typically larger than 0.5 microns in diameter, a coated separator layer with an average pore diameter of less than 100 nm or 0.1 microns will prevent any penetration into the separator layer by the particles of the electrode layer and other overlying layers coated directly or indirectly on the nanoporous separator layer. In one embodiment of the lithium batteries and of making lithium batteries of the present invention, the separator layer has a surface contour or profile that is the same before and after the coating of each of the two electrode layers on one of the separator layers, and the surface of each of the two electrode layers adjacent to the separator layers has a contour that matches the contour of the surface of each of the separator layers immediately adjacent to the two electrode layers. The non-penetration of the particles of the electrode coatings into the separator layers contributes to this retention of the surface contour of the separator layers. In one embodiment, each of the two electrode layers comprises electrode particles selected from the group consisting of electroactive particles and electrically conductive particles, and the electrode particles are not present in the separator layers. In one embodiment, the separator layer comprises separator particles, and the separator particles are not present in the two electrode layers. In one embodiment, the separator particles are selected from the group consisting of inorganic oxide particles, inorganic nitride particles, inorganic carbonate particles, inorganic sulfate particles, and organic polymer particles.

The electrode coating layer may be coated on the full surface of the separator layer, or in lanes or strips on the separator layer, or in patches or rectangle shapes on the separator layer, depending on the requirements of the end use and the specific approach to doing the current collection from the layers of each electrode without having a short circuit due to contacting any layers of the electrode and current collector of opposite polarity. Cathode coating layers typically are coated from a pigment dispersion comprising an organic solvent, such as N-methyl pyrrolidone (NMP), and contain the electroactive or cathode active material in a pigment form, a conductive carbon pigment, and an organic polymer. Anode coating layers typically are coated from a pigment dispersion comprising an organic solvent or water, and contain the electroactive or anode active material in a pigment form, a conductive carbon pigment, and an organic polymer. The choice of which electrode layer, the cathode or the anode, is preferred for coating onto the separator layer may be made based on the ease and quality of the electrode coating and the ease and quality of doing subsequent coating steps, such as depositing the metal current collector layer. For example, it is generally easier to deposit an aluminum metal layer than to deposit a copper or nickel metal layer, so coating the cathode layer on the separator layer to make the separator/electrode assembly is typically preferred. In this case, the anode may be made by the typical method of coating the anode active layer on both sides of a copper or nickel substrate of about 10 microns in thickness.

In one embodiment of the lithium batteries and of making lithium batteries of this invention, the current collector layer of the separator/electrode assembly comprises an electrically conductive material selected from the group consisting of electrically conductive metals, electrically conductive carbons, and electrically conductive polymers. The electrically conductive metals include, but are not limited to, metal pigments, such as, for example, aluminum pigments, copper pigments, and nickel pigments. In one embodiment, the current collector layer of the assembly comprises two or more layers coated directly on one of the two electrode layers, and at least one of the two or more layers comprises an electrically conductive material comprising carbon. In one embodiment, the thickness of the current collector layer of the assembly is less than 3 microns.

However, both the cathode and anode layers may be coated in a separator/electrode assembly and those assemblies combined to form a dry separator/electrode cell. In this case, the separator layer may be present on all of the electrode layers to give a "double separator" layer between the cathode and anode layers or, alternatively, may be present on only one electrode side of the separator/electrode assembly.

For the current collector layer, alternatively, a conductive non-metallic layer, such as a carbon black coating, as known in the art of lithium batteries, may be coated before and/or after the deposition of the metal current collector layer in order to achieve improved current collection and battery efficiency, as well as added mechanical strength and flexibility. The metal current collector layer may be much thinner than the typically 10 to 12 micron thick metal substrates used in lithium batteries. For example, the metal current collector may have a thickness of less than 3 microns, and may be as thin as about 1 micron, such as in the range of 0.5 to 1.5 microns thick. This allows a higher proportion of electroactive material into the lithium battery, thereby enhancing the energy and power densities of the lithium battery. The metal current collector layer may be deposited by any of the metal deposition methods known in the art, such as by vacuum deposition in the case of aluminum layers.

Figure 8:
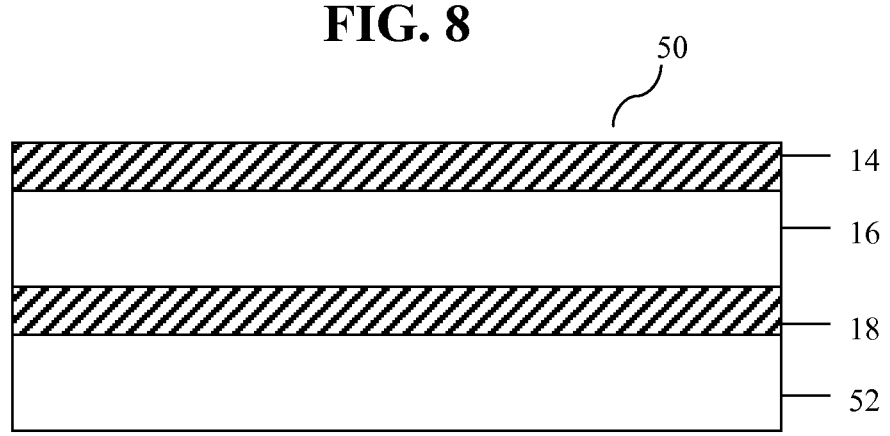
FIG. 8 shows a cross-section view of a separator/electrode stack after the steps to make the separator/electrode stack.
Figure 9:
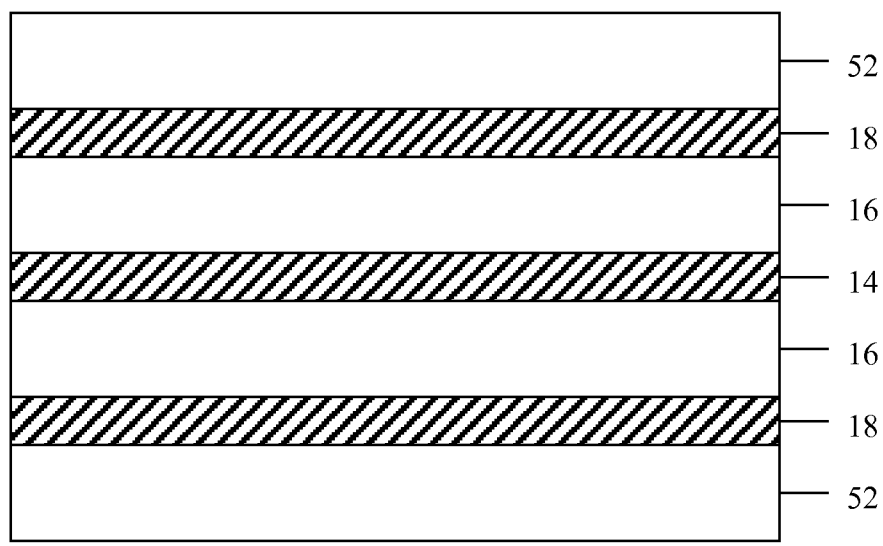
FIG. 9 shows the multilayer structure formed by laminating two of the separator/electrode stacks together and prior to delaminating a substrate.

FIG. 8 shows an example of a cross-section view (not to scale) of a separator/electrode stack 50 after steps (a), (b), and (c). Separator/electrode stack 50 has a substrate 52, a separator layer 18, an electrode layer 16, and a current collector layer 14. FIG. 9 shows an example of the multilayer structure formed by laminating two of the separator/electrode stacks 50 together and has two substrates 52, two separator layers 18, two electrode layers 16, and a current collector layer 14. Delaminating the two substrates 52 in FIG. 9 from the adjacent separator layers 18 results in the separator/electrode assembly, as, for example, shown in FIG. 2.

The lamination and delamination steps may be done by any of the lamination and delamination methods known in the art, such as, for example, by pressure lamination or heat lamination with pressure with the materials of the surfaces to be laminated together being chosen to facilitate the lamination.

The separator/electrode assembly and the electrode may be slit to narrower widths and sheeted to desired shapes prior to interleaving them to make the dry separator/electrode cell with portions of the assembly and of the electrode which are free of overlying and underlying layers with electrodes of the opposite polarity and thus are in a configuration for the current collection of multiple electrode layers of the same polarity.

In one embodiment of the methods of preparing lithium batteries of the present invention, after step (e), a portion of the assembly is not in contact with the electrode and a portion of the electrode is not in contact with the assembly, and wherein a first device with electrically conductive pins electrically connects two or more of the portions of the assembly and a second device with electrically conductive pins electrically connects two or more of the portions of the electrode. An example of the resulting dry separator/electrode cell is shown in FIG. 7. In one embodiment, there are further steps of (1) enclosing the dry separator/electrode cell in a casing and (2) filling with electrolyte and sealing. Suitable casing materials and methods and electrolyte filling and sealing methods include those that are known in the art of lithium batteries. The casing helps to prevent any leakage of electrolyte and to provide additional mechanical protection. The electrolyte filling and sealing convert the dry separator/electrode cell into a "wet" lithium battery ready for charge-discharge cycling and customer use.

In one embodiment of the methods of preparing lithium batteries of this invention, at least one of the one or more current collector layers of step (c) comprises a metal layer and the thickness of the metal layer is less than 3 microns, and preferably is about 1 micron, such as in the range of 0.5 to 1.5 microns thick. In one embodiment, the porous separator comprises pores having an average pore diameter of less than 0.2 microns, and preferably less than 0.1 microns. In one embodiment, the separator has a thickness of less than 9 microns, and is preferably less than 6 microns.

The separator/electrode assembly and the electrode may be slit to narrower widths and sheeted to desired shapes prior to interleaving them to make the dry battery cell with portions of the separator/electrode assembly and of the electrode which are free of overlying and underlying layers with electrodes and current collectors of the opposite polarity and thus are in a configuration for the current collection of multiple electrode and current collector layers of the same polarity. Also, the separator/electrode assembly and the electrode may be slit to narrower widths and interleaved by offsetting them from each other similarly to what is done in making cylindrical lithium batteries by winding together plastic separator, cathode, plastic separator, and anode strips of different widths and edge offsets from each other. Any of the methods of edge connection known in the art of lithium batteries, such as, for example, metal tabbing and vapor deposited metal edges, may also be used for the lithium batteries of this invention. Also, electrically insulating materials may be deposited on the edges of the separator/electrode assembly or the electrode to provide additional protection against any short circuits with the electrode and current collector layers of opposite polarity.

The casing for the lithium batteries and methods of making lithium batteries of this invention may be designed to be useful in the positioning and the alignment of the separator/electrode assembly and the electrode in the interleaving step and also to be useful in the positioning and placement of the device with the electrically conductive pins. For example, in one approach to making flat batteries, the bottom of the casing and four corner posts attached to the bottom could position and hold in place the interleaved separator/electrode assemblies and electrodes at right angles to each other with a slight overlap of each for about 4 to 10 mm on each edge positioned between two of the four corner posts. Referring to FIG. 7, these four corner posts could be positioned at the four corners of the top down view to position and hold in place the sheets during the interleaving step and prior to the edge connection with the device with electrically conductive pins. To complete the battery fabrication, for example, the top of the casing could be then attached to the four corner posts with openings on the edges of the top casing aligned with openings on the edges of the bottom casing and positioned to accept the particular device with electrically conductive pins. After doing the electrical connections on the edges, the remainder, if any, of the four sides of the casing could then be attached to the casing. These sides of the casing for flat batteries are likely to be very short in height, such as less than 10 mm, compared to the width of each side, such as about 100 to 200 mm. The casing may have a fill hole for the electrolyte as an opening on one of the sides, preferably on the top of the casing. After the filling with the electrolyte, this fill opening is sealed to provide the "wet" battery that is ready for formation cycling and testing before customer use.

The casing also provides the pathway for the electrical connections of the battery to the external circuits. This may be done in a variety of ways known in the art of lithium batteries and their casings. For example, the casing may be made of a metal, such as aluminum, as one electrode connection and of a metal pin that is electrically insulated from the metal casing may be accessible on the outside of the casing as the other electrode connection. Also, for example, the casing may be plastic and the devices with electrically conductive pins may be accessible on the outside of the casing for each of the electrodes. Many other variations of edge connection are available. For example, the edge connection for the separator/electrode assembly and the electrode for flat batteries could be done on only one edge, instead of on both edges for each. This approach could further simplify the fabrication of the battery, while still providing effective edge connection. The length and width dimensions of the electrodes may be optimized to match with the preferred edge connection and external electrical connection. For example, for the edge and external electrical connections on only one side of each of the separator/electrode assembly and the electrode, the length of that side might be much larger than the width distance to the side with no electrical connection.

Other electric current producing cells, such as batteries that are not lithium batteries and use a different battery chemistry and capacitors, may also be fabricated by methods similar to those described hereinabove.

What is claimed is:

1. A lithium battery comprising:
    a separator/electrode assembly, wherein said assembly comprises a current collector layer interposed between a first electrode layer and a second electrode layer of the same polarity and a porous separator layer on the side of each of said first and second electrode layers on the side opposite to said current collector layer, wherein each of said electrode layers is coated directly on one of said porous separator layers from a pigment dispersion comprising an organic solvent or water, at least one of said separator layers comprises inorganic oxide particles in an amount greater than 30% by weight, wherein there are no pores larger than 0.2 microns in diameter in the porous separator layer and the porous separator layer comprises a xerogel layer;
    an electrode, wherein said electrode comprises a current collector layer interposed between two electrode layers of the opposite polarity to said first and second electrode layers of the same polarity; and
    an electrolyte, wherein said battery comprises alternating layers of said separator/electrode assembly and said electrode.

2. The battery of claim 1, wherein said current collector layer is coated directly on at least one of said first and second electrode layers of said assembly.

3. The battery of claim 1, wherein each of said first and second electrode layers comprises electrode particles selected from the group consisting of electroactive particles and electrically conductive particles, and wherein said electrode particles are not present in said separator layer.

4. The battery of claim 1, wherein said separator layer comprises separator particles, and wherein said separator particles are not present in said first and second electrode layers.

5. The battery of claim 4, wherein said separator particles are selected from the group consisting of inorganic oxide particles, inorganic nitride particles, inorganic carbonate particles, inorganic sulfate particles, and organic polymer particles.

6. The battery of claim 1, wherein at least a first and second portion of said assembly are not in contact with said electrode.

7. The battery of claim 1, wherein at least a first and second portion of said electrode are not in contact with said assembly.

8. The battery of claim 1, wherein said first and second electrode layers of said assembly are cathode layers.

9. The battery of claim 8, wherein said current collector layer of said assembly comprises an aluminum layer.

10. The battery of claim 1, wherein said first and second electrode layers of said assembly are anode layers.

11. The battery of claim 10, wherein said current collector layer of said assembly comprises a metal layer selected from the group consisting of a copper layer and a nickel layer.

12. The battery of claim 1, wherein the thickness of said separator layer is less than 9 microns.

13. The battery of claim 1, wherein said separator layer comprises aluminum boehmite.

14. The battery of claim 1, wherein said separator layer is a heat resistant separator layer with dimensional stability at 200° C.

15. The battery of claim 1, wherein said current collector layer of said assembly comprises an electrically conductive material selected from the group consisting of electrically conductive metals, electrically conductive carbons, and electrically conductive polymers.

16. The battery of claim 1, wherein said current collector layer of said assembly comprises two or more layers coated directly on one of said two electrode layers, and wherein at least one of said two or more layers comprises an electrically conductive material comprising carbon.

17. A method of making a lithium battery comprising the steps of:
    (a) coating a porous separator on a substrate, the separator comprising inorganic oxide particles in an amount greater than 30% by weight, having no pores larger than 0.2 microns and comprising a xerogel layer;
    (b) coating an electrode layer of one polarity from a pigment dispersion comprising an organic solvent or water directly on said porous separator layer;
    (c) coating one or more current collector layers directly on said electrode layer to make a separator/electrode stack;
    (d) laminating two of said separator/electrode stacks together and delaminating said substrate from said separator layer to form a separator/electrode assembly having said one or more current collector layers interposed between the first and second electrode layers of said assembly; and
    (e) interleaving said assembly with an electrode comprising a current collector layer interposed between two electrode layers of opposite polarity to said electrode layer of step (b) to form a dry separator/electrode cell.

18. The method of claim 17, wherein, after step (e), a portion of said assembly is not in contact with said electrode and a portion of said electrode is not in contact with said assembly, and wherein a first device with electrically conductive pins electrically connects two or more of said portions of said assembly and a second device with electrically conductive pins electrically connects two or more of said portions of said electrode.

19. The method of claim 18, wherein there are further steps of (1) enclosing said dry separator/electrode cell in a casing and (2) filling with electrolyte and sealing.

20. The method of claim 17, wherein said separator layer comprises pores having an average pore diameter of less than 0.1 microns.

21. The battery of claim 1, wherein there are no pores larger than 0.1 microns in the porous separator layer.

22. The battery of claim 3, wherein the surface of each of the two electrode layers adjacent to the separator layers has a contour that matches the contour of the surface of each of the separator layers immediately adjacent to the two electrode layers.

23. The battery of claim 4, wherein the surface of each of the two electrode layers adjacent to the separator layers has a contour that matches the contour of the surface of each of the separator layers immediately adjacent to the two electrode layers.

24. A lithium battery comprising:
a separator/electrode assembly, wherein said assembly comprises a current collector layer interposed between a first electrode layer and a second electrode layer of the same polarity and at least two porous separator layers comprising inorganic oxide particles in an amount greater than 30% by weight, each porous separator layer having no pores larger than 0.2 microns in diameter and comprising a xerogel layer, the at least two porous separator layers positioned on a side of each of said first and second electrode layers that is opposite to said current collector layer,
wherein the surface of each of the two electrode layers adjacent to the separator layers has a contour that matches the contour of the surface of each of the separator layers immediately adjacent to the two electrode layers,
wherein the first and second electrode layers comprise electrode particles selected from the group consisting of electroactive particles and electrically conductive particles, and said electrode particles are coated from a pigment dispersion comprising an organic solvent or water and said electrode particles are not present in said separator layer, and
wherein said separator layer comprises separator particles, and said separator particles are not present in said first and second electrode layers;
an electrode, wherein said electrode comprises a current collector layer interposed between two electrode layers of the opposite polarity to said first and second electrode layers of the same polarity; and
an electrolyte, wherein said battery comprises alternating layers of said separator/electrode assembly and said electrode.

* * * * *